(12) United States Patent
Liu et al.

(10) Patent No.: US 6,660,062 B2
(45) Date of Patent: Dec. 9, 2003

(54) CHEMICAL MODIFICATION OF POLYIMIDES

(75) Inventors: Ye Liu, Singapore (SG); Dong-Fei Li, Singapore (SG); Rong Wang, Singapore (SG); Tai-Shung Chung, Singapore (SG)

(73) Assignee: Institute of Materials Research and Engineering (SG)

( * ) Notice: Subject to any disclaimer, the term of this patent is extended or adjusted under 35 U.S.C. 154(b) by 0 days.

(21) Appl. No.: 10/141,355

(22) Filed: May 9, 2002

(65) Prior Publication Data

US 2003/0070545 A1 Apr. 17, 2003

(51) Int. Cl.⁷ .......................... B01D 53/22; B01D 71/64
(52) U.S. Cl. .................. 95/45; 96/10; 96/13; 96/14; 210/500.39
(58) Field of Search .............................. 95/45, 47–55; 96/4, 13, 14; 210/500.39

(56) References Cited

U.S. PATENT DOCUMENTS

| | | | | |
|---|---|---|---|---|
| 4,486,376 A | | 12/1984 | Makino et al. | |
| 4,717,393 A | | 1/1988 | Hayes | |
| 4,746,474 A | * | 5/1988 | Kohn | 264/41 |
| 4,931,182 A | * | 6/1990 | Burgoyne et al. | 210/500.39 |
| 4,952,220 A | * | 8/1990 | Langsam et al. | 96/13 |
| 4,981,497 A | | 1/1991 | Hayes | |
| 5,042,993 A | * | 8/1991 | Meier et al. | 95/47 |
| 5,045,093 A | | 9/1991 | Meier et al. | |
| 5,055,116 A | * | 10/1991 | Kohn et al. | 95/47 |
| 5,067,970 A | * | 11/1991 | Wang et al. | 95/51 |
| 5,074,891 A | * | 12/1991 | Kohn et al. | 95/47 |
| 5,085,676 A | | 2/1992 | Ekiner et al. | |
| 5,165,963 A | * | 11/1992 | Matsumoto et al. | 427/245 |
| 5,178,650 A | * | 1/1993 | Hayes | 95/47 |
| 5,178,940 A | * | 1/1993 | Matsumoto et al. | 96/13 |
| 5,248,319 A | * | 9/1993 | Ekiner et al. | 95/54 |
| 5,266,100 A | * | 11/1993 | Simmons | 95/43 |
| 5,286,280 A | * | 2/1994 | Chiou | 95/45 |
| 5,286,539 A | * | 2/1994 | Kusuki et al. | 96/10 |
| 5,716,430 A | * | 2/1998 | Simmons | 96/13 |
| 5,817,165 A | * | 10/1998 | Hachisuka et al. | 96/4 |
| 5,882,382 A | * | 3/1999 | Hachisuka et al. | 96/13 |
| 5,917,137 A | * | 6/1999 | Ekiner | 96/10 |
| 5,928,410 A | * | 7/1999 | Jois et al. | 95/51 |
| 5,939,520 A | * | 8/1999 | Langsam | 528/350 |
| 5,964,925 A | * | 10/1999 | Ozcayir et al. | 96/14 |
| 5,969,087 A | * | 10/1999 | Maeda | 528/353 |
| 5,972,080 A | * | 10/1999 | Nagata | 96/13 |
| 6,296,684 B1 | * | 10/2001 | Ekiner | 95/45 |
| 6,383,258 B1 | * | 5/2002 | Simmons | 95/45 |
| 6,383,265 B1 | * | 5/2002 | Ekiner | 96/10 |
| 6,464,755 B2 | * | 10/2002 | Nakanishi et al. | 95/52 |
| 6,497,747 B1 | * | 12/2002 | Ding et al. | 95/45 |

FOREIGN PATENT DOCUMENTS

| | | |
|---|---|---|
| DE | 41 17 501 | 12/1992 |
| EP | 0 401 005 | 12/1990 |
| JP | 9-173801 | 7/1997 |

OTHER PUBLICATIONS

Liu et al., "Chemical cross–linking modification of polyimide membranes for gas separation", Journal of Membrane Science, vol. 189 (2001), pp. 231–239.

* cited by examiner

Primary Examiner—Robert H. Spitzer
(74) Attorney, Agent, or Firm—Larson & Taylor PLC

(57) ABSTRACT

A process is provided for chemically modifying a dual-layer hollow fibre, wherein the fibre comprises a first layer consisting essentially of a polyimide and a second layer consisting essentially of a polymer which is substantially unaffected by the chemical modification process. The process comprises contacting the polyimide layer with a polyamine. In addition, a process is provided for chemically modifying a polyimide membrane in general, using a process which comprises contacting the membrane with an alcoholic solution of an aliphatic-aromatic polyamine.

42 Claims, 3 Drawing Sheets

Fig.1. SEM pictures of the cross section of polyimide/PES dual-layer hollow fiber membranes (scale bars in left and right figures are 50 and 5 microns, respectively).

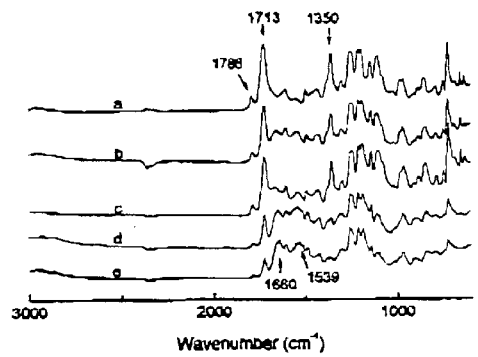

Figure 2. Typical FITR spectra of the outer-layers of a) unmodified and b-e)cross-linked dual-layer hollow fibres (obtained by an immersion in a 5% wt/v p-xylenediamine methanol solution for b) 5 min, c) 30 min, d) 60 min, and e) 16 h, respectively).

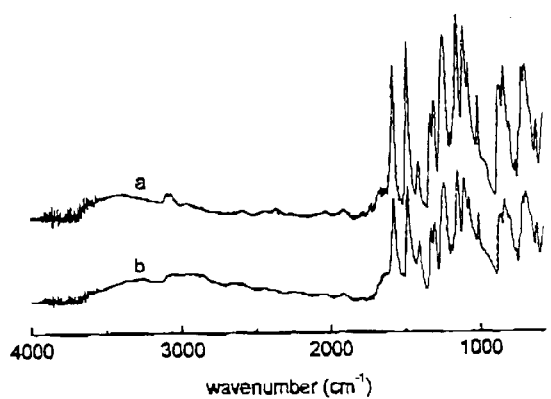
Figure 3. FTIR spectra of the PES inner-layers of a) unmodified and b) cross-linked dual-layer hollow fibres (obtained by an immersion in a 5% wt/v p-xylenediamine methanol solution for 16 h).
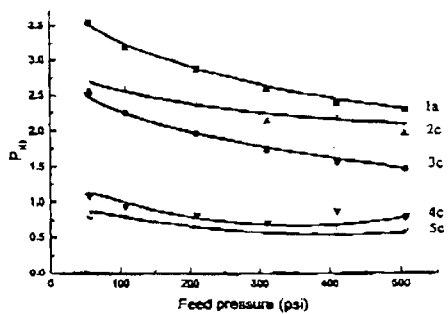
Figure 4. The effect of the feed pressure on $N_2$ permeances of virgin and cross-linked polyimide/PES dual-layer hollow fibers. Modules 1a, 2c, 3c, 4c, and 5c are the same samples as listed in Table 2.

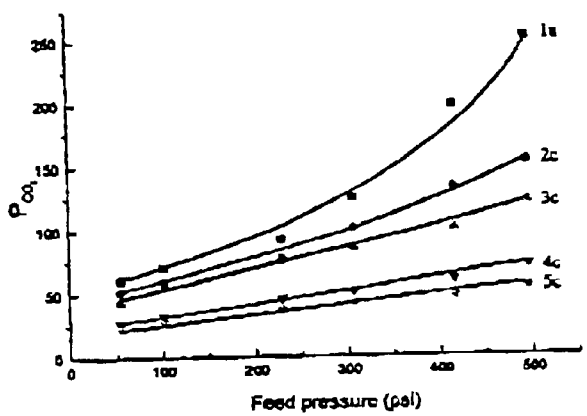
Figure 5. The effect of the feed pressure on $CO_2$ permeances of virgin and cross-linked polyimide/PES dual-layer hollow fibres. Modules 1a, 2c, 3c, 4c, and 5c are the same samples as listed in Table 2

CHEMICAL MODIFICATION OF POLYIMIDES

The present invention relates to the chemical modification of polyimide membranes. In particular it relates to the chemical modification of polyimide membranes which form one layer (preferably the outer-layer) of dual-layer hollow fibres.

Polyimides are attractive membrane materials for gas separations because of their good gas separation and physical properties. Extensive work, including tailoring the chemical structures and performing cross-linking modifications by different methods such as thermal treatment, chemical treatment and UV irradiation, has been carried out aimed at obtaining polyimide membranes with better gas separation properties. Among all these efforts, cross-linking modification is expected to be the most promising approach to obtain better membranes which can be used under complex and harsh environments because it can impart polyimide membranes with anti-plasticization properties and improved chemical resistance.

Most commercial membranes are in the form of hollow fibres because they offer a higher surface to volume ratio. Each hollow fiber membrane usually has an asymmetric cross-section morphology which consists of a thin dense selective layer and a porous supporting substrate. The asymmetric morphology gives the advantage of high flux which is required for practical applications of such membranes. U.S. Pat. No. 5,085,676 discloses a process for preparing dual-layer hollow fibre gas separation membranes which structurally consist of a thin selective layer (usually the outer-layer) and a porous supporting substrate (usually the inner-layer). Not only do these dual-layer membranes have high flux advantages as for other asymmetric membranes, they also optimise materials performance and reduce materials costs.

However, most polyimides suffer plasticization or chemical attack induced by the sorption of $CO_2$, $H_2S$ or other chemicals. Almost all the reported cross-linking modifications of polyimides to enhance chemical resistance and anti-plasticization characteristics have been conducted on thick and flat dense films, which may have very limited applications for the modification of hollow fibre membranes. For example, U.S. Pat. No. 4,717,393 presents photochemical methods for the cross-linking modification of particular polyimides containing benzophenone groups and hydrogen donor groups such as methyl groups. Although this method produces cross-linked polyimides with high gas permselectivity, the gas permeability of these cross-linked polyimides is too low. U.S. Pat. No. 4,981,497 describes a process to modify polyimide membranes with amino compounds. The modification results in lower gas permeation rates as compared to the uncross-linked membranes but is limited to thick dense polyimide films and requires thermal treatment in order to complete the reaction. U.S. Pat. No. 4,931,182 discloses a class of polyimide membranes containing copolymerizable, surface-modifiable units containing both aromatic diamines and alkenylated diamines having a vinyl or vinylaryl group preferably positioned ortho to an amine functionality. The polyimide membranes can be cross-linked by treatment with an activating force such as high energy electromagnetic irradiation or with a free radical source to impart high selectivity to the membranes with a large decrease in composite permeance. Unfortunately, hollow fibres from these kinds of polyimides cannot be easily fabricated.

Therefore, it is essential to investigate new and practical cross-linking modification technologies for polyimide membranes, in particular with the aim of finding processes which can be suitably applied to the manufacture of hollow fibres.

Accordingly, the present invention provides a process for chemically modifying a dual-layer hollow fibre, wherein said fibre comprises a first layer consisting essentially of a polyimide and a second layer consisting essentially of a polymer which is substantially unaffected by the chemical modification process, which process comprises contacting said polyimide layer with a polyamine.

As used herein the term "polyimide" includes blends of two or more different polyimides.

As used herein the term "polymer" includes copolymers and blends of two or more different polymers and/or copolymers.

As used herein, the term "substantially unaffected by the chemical modification process" when used to qualify the nature of the polymer, means that the physical and/or chemical properties of the polymer which make it suitable for use as a support layer for the polyimide remain unaffected by the chemical modification process or are only affected to an extent which does not significantly affect its performance as a support layer for the polyimide.

In a preferred embodiment, the polyimide forms the outer-layer of the dual-layer hollow fibre and the polymer which is substantially unaffected by the chemical modification process forms the inner-layer of the dual-layer hollow fibre.

In one embodiment of the invention, the polyamine may contact only one side of the polyimide layer.

Preferably, the polyimide layer is contacted with the polyamine at a temperature in the range of from 5° C. to 50° C., more preferably in the range of from 15° C. to 30° C.

In one embodiment of the invention, the polyamine is contacted with the polyimide layer in the form of a solution in a suitable solvent. In this case, contact may be effected by simply dipping the dual-layer hollow fibre in the solution. When a solution of polyamine is used the polyimide layer is preferably washed with the solvent after contact with the polyamine solution. Preferred solvents include water and alcohols which are liquid at ambient temperature, such as methanol. Methanol is particularly preferred.

In a preferred embodiment, at the end of the process, the dual-layer hollow fibre is dried at a temperature in the range of from 5° C. to 80° C., more preferably at a temperature in the range of from 15° C. to 40° C.

Whilst the process of the present invention could be applied to many types of polyimide, a preferred polyimide for use in the polyimide layer is an aromatic polyimide membrane.

Preferably the polyimide layer consists essentially of the following structural units:

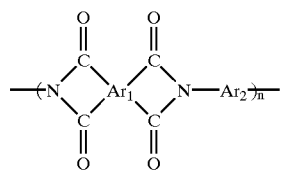

where each of the n $Ar_1$ groups is a quadrivalent aromatic moiety independently selected from the group consisting of:

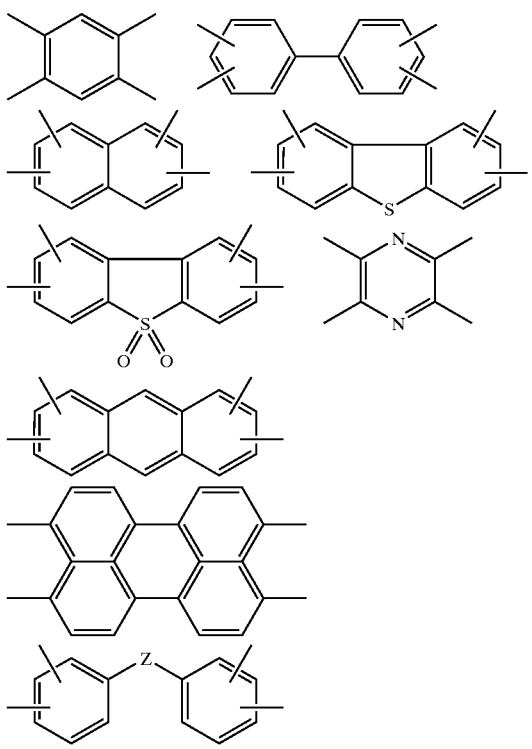

and where each of the n Ar₂ groups is a bivalent aromatic moiety independently selected from the group consisting of:

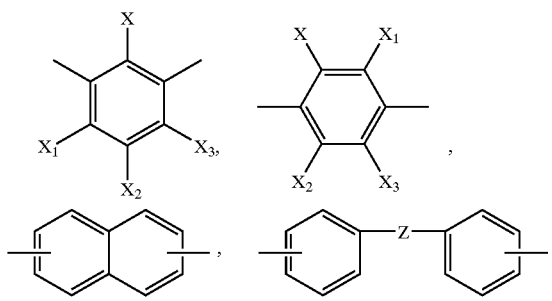

where Z is selected from the group consisting of:

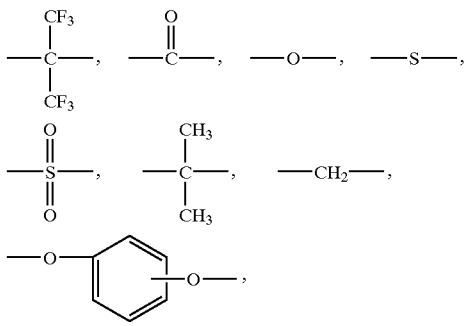

and where X, $X_1$, $X_2$ and $X_3$ are each independently selected from hydrogen, $C_{1-5}$alkyl, $C_{1-5}$alkoxy, phenyl or phenoxy.

The value of n must be sufficient to provide a viable polymer membrane for use as the polyimide layer of a dual layer hollow fibre. Preferably, n is a number sufficient that said polymer has an inherent viscosity of at least 0.3 dL/g as measured at 25° C. on a 0.5% by weight solution in N-methylpyrrolidinone.

In a preferred embodiment of the present invention, the polyamine is an aliphatic-aromatic polyamine. More preferably, the polyamine is an aliphatic-aromatic diamine. Even more preferably, the polyamine is an aliphatic-aromatic diamine having the general structure:

where $Ar_2$ is as defined above and a and b are each independently selected from the range 1 to 6. Still more preferably, the polyamine is an aliphatic-aromatic diamine having the general structure:

Most preferably, the polyamine is selected from m-xylylenediamine or p-xylylenediamine.

As previously mentioned, the polyamine may be used in the form of a solution. In a preferred embodiment of the process, the polyamine is contacted with the polyimide layer in the form of a solution having a concentration of polyamine of from 2 wt % to 50 wt % based on the total weight of the solution. More preferably, the polyamine is contacted with the polyimide layer in the form of a solution having a concentration of polyamine of from 2 wt % to 20 wt % based on the total weight of the solution. Most preferably, the polyamine is contacted with the polyimide layer in the form of a solution having a concentration of polyamine of from 5 wt % to 10 wt % based on the total weight of the solution.

The identity of the inert (or non-crosslinked) layer material is not critical to the present invention. It is simply necessary that it remain substantially unaffected by the modification process. Suitable polymers for forming the inert layer may be selected from polyesters, polysulfone, polycarbonate, polyetherketone, polyetheretherketone, polyethersulfone, polyetherimide, polyacrylonitrile, polyamide and polyolefin. Polyethersulfone and polysulfone are particularly preferred.

The present invention also provides for a chemically modified dual-layer hollow fibre obtainable by a process as previously described.

The present invention also provides for a process for separating at least one gas from a mixture of two or more gases, which process comprises bringing a pressurised mixture of said gases into contact with a dual-layer hollow fibre obtainable by a process as previously described. The gas mixtures for separation may be selected from mixtures of He and $N_2$, $H_2$ and $N_2$, $O_2$ and $N_2$, $CO_2$ and $CH_4$, $CO_2$ and $H_2S$ and $CH_4$, and $CO_2$ and $H_2S$ and $CH_4$ and $C_2$–$C_4$ hydrocarbons. The dual-layer hollow fibre obtainable by a process as previously described is particularly useful for separation of a mixture of $CO_2$ and $CH_4$ or a mixture of $CO_2$ and $H_2S$ and $CH_4$.

In another aspect, the present invention also provides a process for chemically modifying a polyimide membrane, which process comprises contacting said membrane with an alcoholic solution of an aliphatic-aromatic polyamine.

Alcohols suitable for use as the solvent include any alcohol which is liquid at ambient temperature and is capable of solubilising the aliphatic-aromatic polyamine. Methanol is a particularly preferred solvent.

Preferably, the membrane is contacted with the solution at a temperature in the range of from 5° C. to 50° C., more preferably at a temperature in the range of from 15° C. to 30° C.

In a preferred embodiment of the process, the membrane is washed with the alcoholic solvent after contact with the solution.

In another preferred embodiment of the process, after contact with the solution or after being washed with the alcoholic solvent, the membrane is dried at a temperature in the range of from 5° C. to 80° C., more preferably at a temperature in the range of from 15° C. to 40° C.

In a preferred embodiment of the process, the polyimide membrane is an aromatic polyimide membrane. More preferably, the polyimide membrane consists essentially of the following structural units:

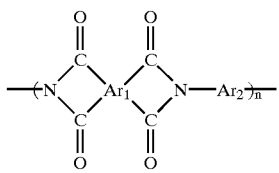

where each of the n $Ar_1$ is a quadrivalent aromatic moiety independently selected from the group consisting of:

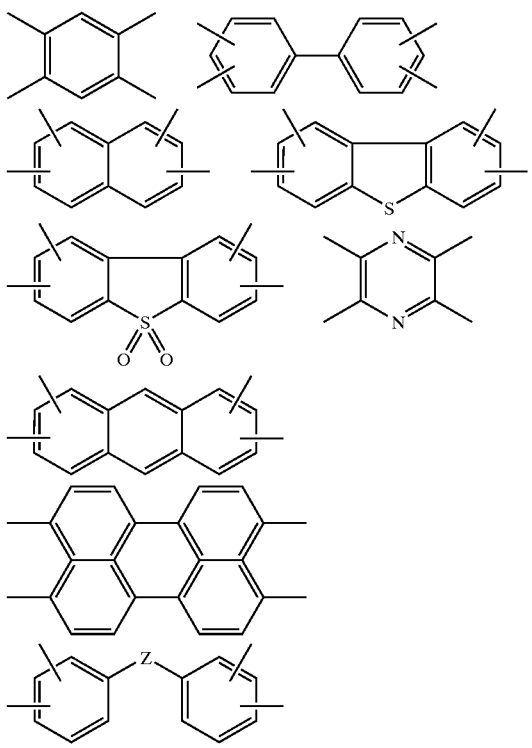

and where each of the n $Ar_2$ groups is a bivalent aromatic moiety independently selected from the group consisting of:

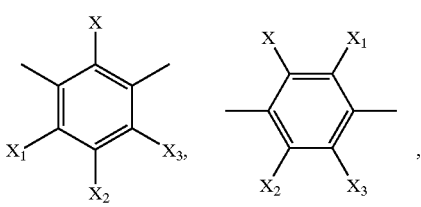

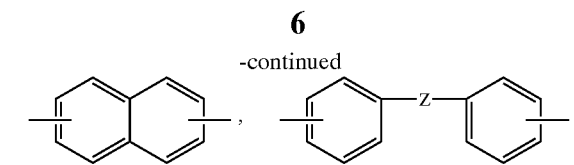

where Z is selected from the group consisting of:

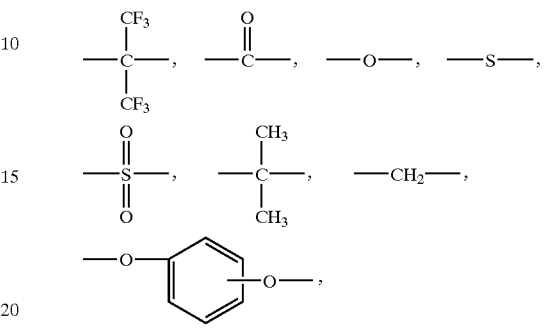

and where X, $X_1$, $X_2$ and $X_3$ are each independently selected from hydrogen, $C_{1-5}$alkyl, $C_{1-5}$alkoxy, phenyl or phenoxy.

The value of n must be sufficient to provide a viable polymer membrane. Preferably, n is a number sufficient that said polymer has an inherent viscosity of at least 0.3 dL/g as measured at 25° C. on a 0.5% by weight solution in N-methylpyrrolidinone In a preferred embodiment of the process, the aliphatic-aromatic polyamine is an aliphatic-aromatic diamine. More preferably, the aliphatic-aromatic polyamine is an aliphatic-aromatic diamine having the general structure:

$$H_2N(CH_2)_a-Ar_2-(CH_2)_bNH_2$$

where $Ar_2$ is as defined above and a and b are each independently selected from the range 1 to 6. Still more preferably, the aliphatic-aromatic polyamine is an aliphatic-aromatic diamine having the general structure:

$$H_2NH_2C-\text{(phenyl)}-CH_2NH_2$$

Most preferably, the aliphatic-aromatic polyamine is selected from m-xylylenediamine or p-xylylenediamine.

Preferably, the aliphatic-aromatic polyamine is present in the solution in a concentration of from 2 wt % to 50 wt % based on the total weight of the solution. More preferably the aliphatic-aromatic polyamine is present in the solution in a concentration of from 2 wt % to 20 wt % based on the total weight of the solution. Most preferably, the aliphatic-aromatic polyamine is present in the solution in a concentration of from 5 wt % to 10 wt % based on the total weight of the solution.

In a preferred embodiment, the polyimide membrane is in the form of a hollow fibre.

In a particularly preferred embodiment, the polyimide membrane is the selective layer of a dual-layer hollow fibre, the support layer of said dual-layer hollow fibre comprising a polymer which is substantially unaffected by the chemical modification process. Most preferably, the polyimide membrane forms the outer layer of said dual-layer hollow fibre.

The novelty of the present invention resides in the use of alcoholic (preferably methanolic) solutions of rigid aliphatic-aromatic diamines such as p-xylene diamines as a chemical cross-linking reagent for polyimides and in particular for dual-layer hollow fibres with polyimides as the selective layer.

Advantageously, the modification can be performed at ambient temperature, and adopting inert materials as the support layer of dual-layer hollow fibre membranes helps to reduce the side effects of chemical modification which often makes such processes unsuitable for application to dual-layer hollow fibres. This invention provides a feasible method for the production of high-selectivity and anti-plasticisation dual-layer hollow fibres for gas separation and also provides an improved general method of chemical modification of polyimides (which may be in the form of single or dual-layer hollow fibres for gas separation).

The processes of this invention can produce high-selectivity and anti-plasticisation single-layer and dual-layer hollow fibres containing a chemically cross-linked polyimide layer for gas separation. The gas mixtures include the mixtures of $H_2/N_2$, $CO_2/CH_4$ and $O_2/N_2$. Also the membranes fabricated can be used for separation of volatile organic mixtures.

FIG. 1 shows scanning electron micrograph (SEM) pictures of the cross-section of polyimide/polyethersulfone (PES) dual-layer hollow fibre membranes.

FIG. 2 shows typical FTIR spectra of the outer-layers of unmodified and cross-linked dual-layer hollow fibres.

FIG. 3 shows FTIR spectra of the PES inner-layers of unmodified and cross-linked dual-layer hollow fibres.

FIG. 4 shows the effect of feed pressure on $N_2$ permeances of virgin and cross-linked polyimide/PES dual-layer hollow fibres.

FIG. 5 shows the effect of feed pressure on $CO_2$ permeances of virgin and cross-linked polyimide/PES dual-layer hollow fibres.

EXAMPLES

Preparative Example 1

A stoichiometric amount of 2,2'-bis(3,4-carboxylphenyl) hexafluoropropane dianhydride (6FDA) was added to an N-methylpyrrolidinone (NMP) solution of 2,3,5,6-tetramethyl-1,4-phenylene diamine (durene diamine) and 1,3-phenylene diamine (mPDA) (the molar ratio of durene diamine to mPDA was 50:50) with stirring under argon at ambient temperature. 24 h later, a mixture of acetic anhydride and triethylamine (the molar ratio of acetic anhydride/triethylamine to 6FDA was 4:1) was slowly added to the solution to complete imidization for 24 h. The polymer was slowly precipitated in methanol. After being filtered and washed with fresh methanol, the resultant polymer was dried under 150° C. in vacuum for 24 h. Its inherent viscosity was measured to be 1.00 dL/g in NMP.

Preparative Example 2

The spinning of dual-layer hollow fibers was carried out as follows. 26 wt % 6FDA-durene/mPDA (50:50) in a solvent mixture of NMP/THF (5:3 by weight) was chosen as the dope to yield the outer dense selective layer, whereas 28 wt % polyethersulfone (FES) in a solvent mixture of NMP/$H_2O$ (10:1 by weight) was selected as the dope to form the inner porous substrate layer. The two dopes were delivered to the spinneret by two metering pumps at a rate of 0.2 ml/min for the outer layer and 0.6 ml/min for the inner layer, respectively. The spinneret temperature was controlled at 60° C. A 95:5 mixture solvent of NMP: $H_2O$ in weight was selected as the bore fluid and delivered by an ISCO 500D syringe pump at a rate of 0.2 ml/min. After passing through an air gap of 0.3 cm, the nascent hollow fibers were drawn into a tap water coagulation bath at ambient temperature and collected at a take-up velocity of 40 cm/min. After having been stored in water for 3 days at room temperature, the dual-layer hollow fibers were immersed in methanol three times and then in hexane three times for solvent exchange. Fresh solvents were used in each solvent exchange with a duration of 30 min. Subsequently, thermal treatments of the hollow fibers were carried out progressively under vacuum at 35° C., 45° C., 55° C., 65° C. for 30 min, respectively, and finally at 75° C. for 1 hour.

SEM photomicrographs of the dual-layer asymmetric hollow fibres are shown in FIG. 1. For SEM experiments the dual-layer hollow fibres were fractured after being immersed in liquid nitrogen, and then sputtered with gold using a JEOL JFC-1100E ion sputtering device. A Philips XL30-SEM was used to investigate the fibre morphology. The dual-layer hollow fibres have a good concentricity with a center bore diameter of 170 $\mu$m. FIG. 1 exhibits the asymmetric morphology of the outer layer which consists of a thin dense selective layer near the outer surface. The thickness of the outer polyimide layer and inner PES porous layer are 10 and 100 $\mu$m, respectively. No delamination between the outer layer and inner layer is observed. The inner layer is comprised of macrovoids with interconnected porosities which may significantly minimize the substructure resistance for gas transport. As a result, the outer polyimide layer determines gas separation performance properties of the dual layer hollow fibres.

Five modules were prepared by sealing one of the ends of a bundle of 10 dual-layer fibres with a length of 20 cm with a 5 min rapid solidified epoxy resin (Araldite®, Switzerland) and gluing the other end onto an aluminum holder with an epoxy resin H-711 (Tianjin Jindong Chemical Plant, Tianjin, P. R. China) cured by using a hardener 105 (Changsha Institute of Chemical Engineering, Changsha, P. R. China).

The $O_2$ and $CH_4$ permeation rates were conducted at 200 psi, while $N_2$ and $CO_2$ were at a pressure range from 50 to 500 psi. All measurements took place at 24° C. The gas permeance and separation factor were determined using a bubble-flow meter and calculated based on the equation described in a previous paper [J. J. Shieh, T. S. Chung, Cellulose nitrate-based multilayer composite membranes for gas separation, J. Membr. Sci., 66 (2000) 2591. Table 1 summarizes the gas permeation properties of these modules just after their fabrication.

TABLE 1

Gas separation properties of the as-spun polyimide-polyethersulfone dual-layer hollow fibre modules.[a]

| Module No. | Permeance (GPU)[b] | | Speparation Factor | | |
|---|---|---|---|---|---|
| | $CO_2$ | $O_2$ | $O_2/N_2$ | $CO_2/N_2$ | $CO_2/CH_4$ |
| 1 | 240 | 27.0 | 4.1 | 37 | 56 |
| 2 | 227 | 31.0 | 4.5 | 33 | 47 |
| 3 | 206 | 29.7 | 4.3 | 30 | 40 |
| 4 | 219 | 32.1 | 4.1 | 28 | 38 |
| 5 | 218 | 23.7 | 4.4 | 41 | 60 |

[a]measured at 24° C., for $CO_2$ and other gases the feed pressure was 100 and 200 psi respectively.
[b]1 GPU = 1 × $10^{-6}$ cm$^3$(STP)/cm$^2$.sec.cmHg.

Comparative Example 1 and Examples 2–5

In order to remove the plasticization effects of $CO_2$ during and subsequently after the permeance measurements, chemical cross-linking modification of the modules was carried out 5 days after the $CO_2$ permeance tests. Module 1 is used as the reference and modules 2, 3, 4 and 5 were immersed in a 5% (wt/v) p-xylenediamine methanol solution for 0.5, 1, 3 and 5 min respectively.

ATR-FTIR measurements were carried out utilizing a Perkin Elmer FTIR spectrometer and carefully flattened hollow fibres. FIG. 2 shows a comparison of FTIR spectra of the outer layers of polyimide dual-layer hollow fibers before and after the cross-linking modification. The characteristic peaks of amide group at 1660 $cm^{-1}$ (asymmetric stretch of C=O in the amide group) and 1539 $cm^{-1}$ (symmetric stretch of C=O in the amide group) appear after the modification as shown in FIGS. 2b to 2e. With the progress of chemical modification, the intensities of the characteristic peaks of imide group at 1786 $cm^{-1}$ (symmetric stretch of C=O in the imide group), 1713 $cm^{-1}$ (symmetric stretch of C=O in the imide group) and 1350 $cm^{-1}$ (stretch of C—N in the imide group) decrease with an increase in the immersion time. These phenomena show that the reactions between p-xylenediamine and imide groups produce amide groups and form the chemical cross-linking.

FIG. 3 shows a comparison of the polyethersulfone innerlayer's FTIR spectra of the unmodified and modified dual-layer hollow fibers after carefully removing the polyimide outer layer. No apparent changes in the chemical structure of the PES inner layer can be detected in FIG. 3b as compared with 3a. It clearly indicates the inert property of the PES inner layer to the proposed chemical cross-linking modification. The modified sample is obtained by immersing the hollow fibers in a 5% wt/v p-xylenediamine methanol solution for 16 h. However, the chemical modification induces significant changes in the chemical structure of the polyimide outer layer illuminated by the comparison of FIGS. 2a to 2e. The inert property of the PES inner-layers gives assurance that there is no significant adversary effect of the chemical cross-linking modification on the substrate layer. For example, in the case of mechanical properties, the cross-linked dual-layer hollow fibers obtained by an immersion in a 5% wt/v p-xylenediamine methanol solution for 16 h remain flexible, while a 1 h immersion makes single layer 6FDA-durene/mPDA (50:50) hollow fibers fragile.

Table 2 tabulates the gas separation properties of the reference module and cross-linking modified modules, which are referred to as module 1a, 2c, 3c, 4c and 5c correspondingly. Since the dual layer membranes were fabricated using the phase inversion technique, the precipitation process is a non-equilibrium stage. Similar to single layer asymmetric hollow fiber membranes [W. J. Koros, G. K. Fleming, Membrane-based gas separation, J. Membr. Sci., 83 (1993) 1; S. A. Stern, Polymers for the gas separation: the next decade, J. Membr. Sci., 94 (1994) 1; T. S. Chung, S. K. Teoh, The ageing phenomenon of polyethersulfone hollow fiber membranes for gas separation and their characteristics, J. Membr. Sci., 152 (1999)] 175], the permeance of the as-spun dual layer membranes drops steeply during the 40 days following fabrication and levels off thereafter. This ageing phenomenon is a typical nature of glass polymers, which have the tendency to relax and densify toward an equilibrium state. The densification reduces the free volume and interstitial space among polymeric chains available for gas transport. Thus, a comparison of Tables 1 and 2 indicate a significant permeance drop for the unmodified module after seven days of ageing (5 days to remove the $CO_2$ effects after permeance measurements and two days for cross-linking modification).

TABLE 2

Gas separation properties of the reference and cross-linked polyimide-polyethersulfone dual-layer hollow fibre modules.[a]

| Module No. | Immersion time (min) | Permeance (GPU)[b] | | Speararation Factor | | |
|---|---|---|---|---|---|---|
| | | $CO_2$ | $O_2$ | $O_2/N_2$ | $CO_2/N_2$ | $CO_2/CH_4$ |
| 1a | 0 | 70.4 | 12.9 | 3.6 | 25 | 40 |
| 2c | 0.5 | 59.2 | 8.86 | 3.5 | 30 | 55 |
| 3c | 1 | 57.8 | 7.60 | 3.0 | 24 | 46 |
| 4c | 3 | 32.7 | 3.73 | 3.4 | 40 | 84 |
| 5c | 5 | 28.3 | 3.01 | 3.8 | 41 | 101 |

[a]measured at 23° C., the feed pressure of $O_2$ and $N_2$ was 200 psi and of $CO_2$ was 100 psi.
[b]1 GPU = 1 × $10^{-6}$ $cm^3(STP)/cm^2.sec.cmHg$.

A comparison of the cross-linked modules 2c, 3c, 4c and 5c with the reference module 1a listed in Table 2 clearly shows that cross-linking modification of dual-layer hollow fibers leads to a decrease in gas permeation rate and an increase in gas separation factor, especially for $CO_2/CH_4$. In addition, a longer immersion results in a lower gas permeation rate.

FIGS. 4 and 5 display the gas permeation rates of relatively un-condensable gas, $N_2$, and relatively condensable gas, $CO_2$, measured over a pressure range from 50 to 500 psi at 23° C.

Since polyimide/PES dual-layer hollow fibres cannot be plasticized by the absorption of $N_2$, the experimental results shown in FIG. 4 indicate that the $N_2$ permeance of the dual-layer hollow fibres decreases with an increase in the feed pressure. This relationship is consistent with the partially immobilized dual-sorption model because the Langmuir sites are rapidly saturated and also have a much less contribution to the overall diffusivity. In contrast, FIG. 5 illustrates that the $CO_2$ permeance of the dual-layer hollow fibres shows an upward relationship with increasing feed pressure in the whole pressure range from 50 to 500 psi. This phenomenon arises from the fact that plasticization induced by the absorption of condensable $CO_2$ results in increased free volume and polymer chain mobility. The upward inflection in gas permeability when the feed pressure is higher than the plasticization pressure has been extensively investigated on thick polymeric dense films. However, the degree of $CO_2$ plasticization on thick dense films and dual layer fibers are different. FIG. 5 depicts that the $CO_2$ permeance of the unmodified dual-layer hollow fibers, module 1a, increases with increasing pressure in the whole measurement range starting from 50 psi, and by about 4.1 times when the feed pressure reaches 500 psi. Under the similar situation, the increase is by about 2 times for a 20 mm polyimide dense film of similar structure [M. J. Thundyil, Y. H. Jois, W. J. Koros, Effect of permeate pressure on the mixed gas permeation of carbon dioxide and methane in a glassy polyimides, J. Membr. Sci., 152 (1999) 29]. The higher permeance increase is due to the fact that the plasticization initiates at a lower feed pressure for the dual-layer hollow fibers, indicating the thin asymmetric polyimide outer layer is more subject to plasticization than a thick dense film. A similar phenomenon has been observed by Prof. Koros' research group [S. M. Jordan, M. A. Henson, W. J. Koros, The effect of carbon dioxide conditioning on the permeation behavior of hollow fiber asymmetric membranes, J. Membr, Sci., 54 (1990) 103] where they reported the plasticisation of single-layer asymmetric hollow fibers is heavier than that of thick and flat dense films. The easier plasticization for asymmetric hollow fibers probably resulted from the fact that the thin dense selective layer of hollow fibers consists of loose packed nodules. Thus, they can be swelled easily with the $CO_2$ absorption.

FIG. 5 shows that the proposed chemical cross-linking modification is efficient to suppress the plasticisation of the dual-layer hollow fibers induced by $CO_2$. The cross-linked dual-layer hollow fibers, modules 2c, 3c, 4c, and 5c, obviously have lower permeance increases with an increase in the feed pressure when compared with unmodified module 1a. In addition, a higher degree of cross-linking resulting from a longer time immersion leads to a lower plasticization tendency. The improvements in anti-plasticisation properties is mainly attributed to the fact that the proposed cross-linking modification tightens and strengthens the polyimide nodules, thus reduces the $CO_2$ sorption and hinders the nodules from swelling. As a result, the integrity of the outer thin dense selective layer and its effective thickness are less susceptible to $CO_2$ sorption after the chemical modification.

What is claimed is:

1. A process for chemically modifying a dual-layer hollow fibre, wherein said fibre comprises a first layer consisting essentially of a polyimide and a second layer consisting essentially of a polymer which is substantially unaffected by the chemical modification process, which process comprises contacting said polyimide layer with a polyamine.

2. A process as claimed in claim 1 wherein the polyimide forms the outer-layer of the dual-layer hollow fibre and the polymer which is substantially unaffected by the chemical modification process forms the inner-layer of the dual-layer hollow fibre.

3. A process as claimed in claim 1 wherein the polyamine contacts only one side of the polyimide layer.

4. A process as claimed in claim 1 wherein the polyimide layer is contacted with the polyamine at a temperature in the range of from 50° C. to 50° C.

5. A process as claimed in claim 1 wherein the polyimide layer is contacted with the polyamine at a temperature in the range of from 15° C. to 30° C.

6. A process as claimed in claim 1 wherein the polyamine is in the form of a solution in a suitable solvent when it is contacted with the polyimide layer.

7. A process as claimed in claim 6 wherein the polyimide layer is washed with the solvent after contact with the polyamine solution.

8. A process as claimed in claim 1 wherein, at the end of the process, the dual-layer hollow fibre is dried at a temperature in the range of 5° C. to 80° C.

9. A process as claimed in claim 1 wherein, at the end of the process, the dual-layer hollow fibre is dried at a temperature in the range of from 15° C. to 40° C.

10. A process as claimed in claim 1 wherein the polyimide layer is an aromatic polyimide membrane.

11. A process as claimed in claim 1 wherein the polyimide layer is formed of a polymer that consists essentially of the following structural units:

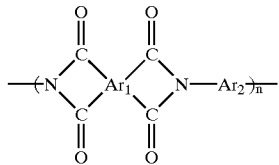

where each of the n $Ar_1$ groups is a quadrivalent aromatic moiety independently selected from the group consisting of:

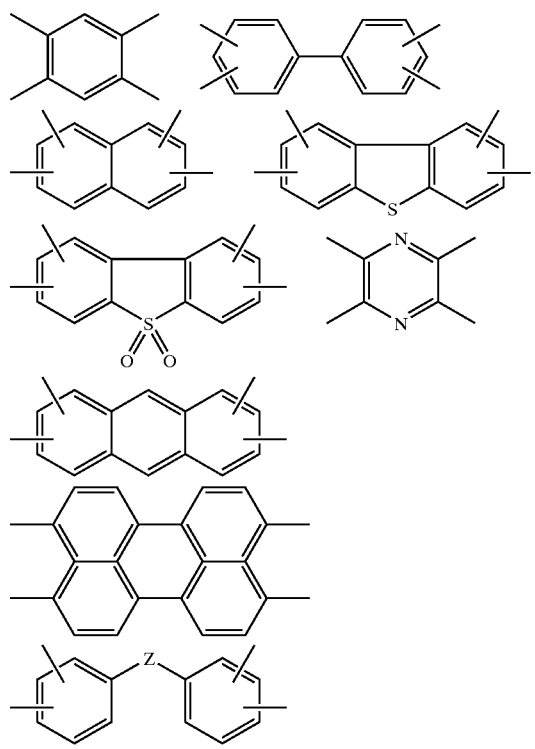

and where each of the n $Ar_2$ is a bivalent aromatic moiety independently selected from the group consisting of:

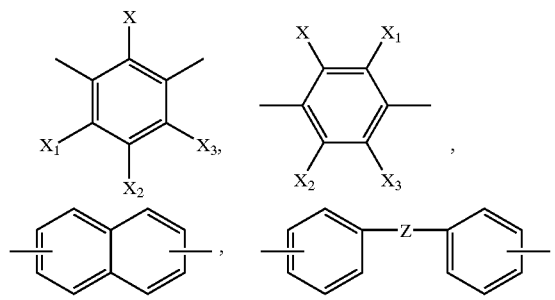

where Z is selected from the group consisting of:

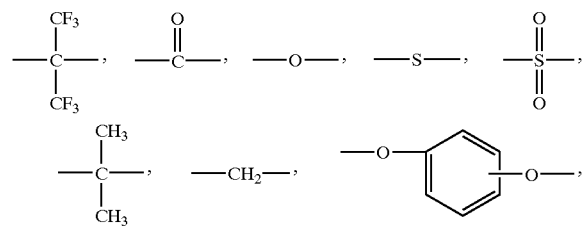

and where X, $X_1$, $X_2$ and $X_3$ are each independently selected from hydrogen $C_{1-5}$alkyl, $C_{1-5}$alkoxy, phenyl or phenoxy, and wherein n is a number sufficient for said polymer to have an inherent viscosity of at least 0.3 dL/g as measured at 25° C. on a 0.5% weight solution in N-methylryrrolidone.

12. A process as claimed in claim 1 wherein the polyamine is an aliphatic-aromatic polyamine.

13. A process as claimed in claim 1 wherein the polyamine is an aliphatic-aromatic diamine.

14. A process as claimed in claim 1 wherein the polyamine is an aliphatic-aromatic diamine having the general structure:

where $Ar_2$ is as defined in claim 11 above and a and b are each independently selected from the range 1 to 6.

15. A process as claimed in claim 1 wherein the polyamine is an aliphatic-aromatic diamine having the general structure:

16. A process as claimed in claim 1 wherein the polyamine is selected from m-xylylenediamine or p-xylylenediamine.

17. A process as claimed in claim 1 wherein the polyamine is contacted with the polyimide layer in the form of a solution having a concentration of polyamine of from 2 wt % to 50 wt % based on the total weight of the solution.

18. A process as claimed in claim 1 wherein the polyamine is contacted with the polyimide layer in the form of a solution having a concentration of polyamine of from 2 wt % to 20 wt % based on the total weight of the solution.

19. A process as claimed in claim 1 wherein the polyamine is contacted with the polyimide layer in the form of a solution having a concentration of polyamine of from 5 wt % to 10 wt % on the total weight of the solution.

20. A chemically modified dual-layer hollow fibre obtainable by a process as claimed in claim 1.

21. A process for separating at least one gas from a mixture of two or more gases, which process comprises bringing a pressurised mixture of said gases into contact with a dual-layer hollow fibre as claimed in claim 20.

22. A process as claimed in claim 21 wherein the gas mixtures for separation are selected from mixtures of He and $N_2$, $H_2$ and $N_2$, $O_2$ and $N_2$, $CO_2$ and $CH_4$, $CO_2$ and $H_2S$ and $CH_4$, and $CO_2$ and $H_2S$ and $CH_4$ and $C_2$–$C_4$ hydrocarbons.

23. A process as claimed in claim 21 wherein the gas mixtures for separation are selected from mixtures of $CO_2$ and $CH_4$, and $CO_2$ and $H_2S$ and $CH_4$.

24. A process for chemically modifying a polyimide membrane, which process comprises contacting said membrane with an alcoholic solution of an aliphatic-aromatic polyamine.

25. A process as claimed in claim 24 wherein the alcoholic solution of an aliphatic-aromatic polyamine is a methanolic solution of an aliphatic-aromatic polyamine.

26. A process as claimed in claim 24 wherein the membrane is contacted with the solution at a temperature in the range of from 5° C. to 50° C.

27. A process as claimed in claim 24 wherein the membrane is contacted with the solution at a temperature in the range of from 15° C. to 30° C.

28. A process as claimed in claim 24 wherein the membrane is washed with the alcoholic solvent after contact with the solution.

29. A process as claimed in claim 28 wherein, after contact with the solution or after being washed with the alcoholic solvent, the membrane is dried at a temperature in the range of from 5° C. to 80° C.

30. A process as claimed in claim 29 wherein said temperature is in the range of from 15° C. to 40° C.

31. A process as claimed in claim 24 wherein the polyimide membrane is an aromatic polyimide membrane.

32. A process as claimed in claim 24 wherein the polyimide membrane is formed from a polymer that consists essentially of the following structural units:

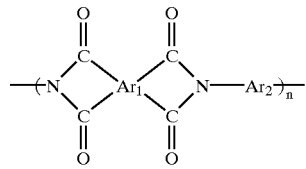

where each of the n $Ar_1$ groups is a quadrivalent aromatic moiety independently selected from the group consisting of:

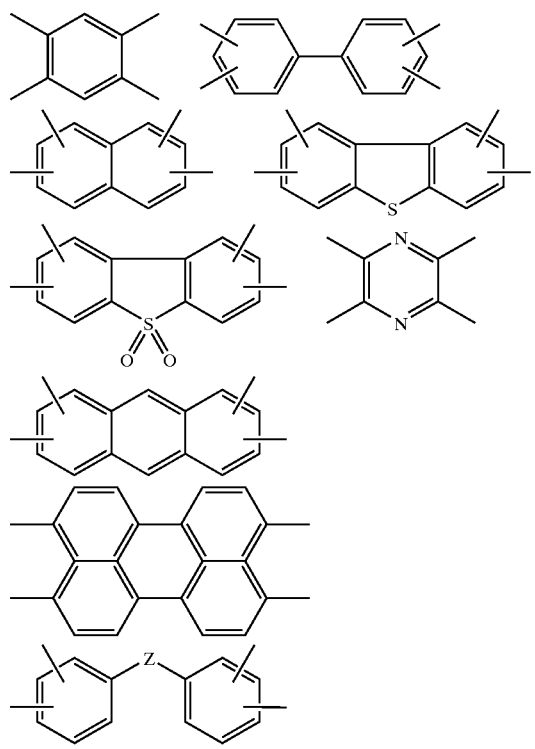

and where each of the $Ar_2$ groups is a bivalent aromatic moiety independently selected from the group consisting of:

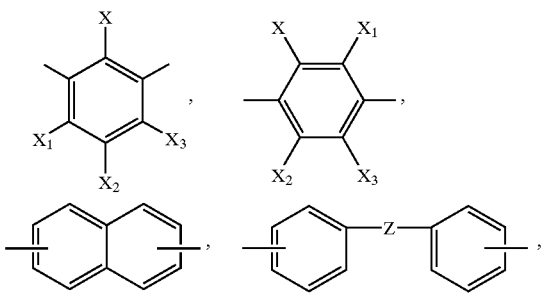

where Z is selected from the group consisting of:

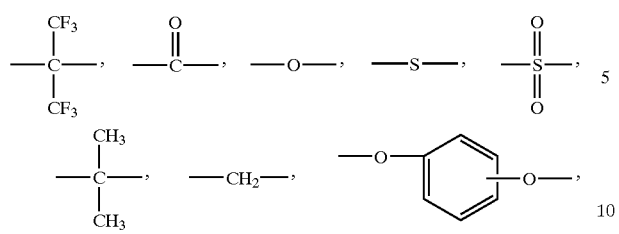

wherein X, $X_1$, $X_2$, $X_3$ are each independently selected from hydrogen, $C_{1-5}$alkyl, $C_{1-5}$alkoxy, phenyl or phenoxy, and wherein n is a number sufficient for said polymer to have an inherent viscosity of at least 0.3 dL/g as measured at 25° C. on a 0.5% by weight solution in N-methylpyrrolidinone.

33. A process as claimed in claim 24 wherein the aliphatic-aromatic polyamine is an aliphatic-aromatic diamine.

34. A process as claimed in claim 24 wherein the aliphatic-aromatic polyamine is an aliphatic-aromatic diamine having the general structure:

$H_2N(CH_2)_a$—$Ar_2$—$(CH_2)_b NH_2$ where $Ar_2$ is as defined as in claim 32 and a and b are each independently selected from the range 1 to 6.

35. A process as claimed in claim 24 wherein the aliphatic-aromatic polyamine is an aliphatic-aromatic diamine having the general structure:

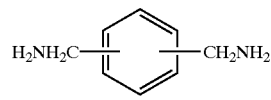

36. A process as claimed in claim 24 wherein the aliphatic-aromatic polyamine is selected from m-xylylenediamine or p-xylylenediamine.

37. A process as claimed in claim 24 wherein the aliphatic-aromatic polyamine is present in the solution in a concentration of from 2wt % to 50 wt % based on the total weight of the solution.

38. A process as claimed in claim 24 wherein the aliphatic-aromatic polyamine is present in the solution in a concentration of from 2 wt % to 20 wt % based on the total weight of the solution.

39. A process as claimed in claim 24 wherein the aliphatic-aromatic polyamine is present in the solution in a concentration of from 5 wt % to 10 wt % based on the total weight of the solution.

40. A process as claimed in claim 24 where the polyimide membrane is in the form of a hollow fibre.

41. A process as claimed in claim 24 where the polyimide membrane is the outer-layer of a dual-layer hollow fibre, the inner-layer of said dual-layer hollow fibre comprising a polymer which is substantially unaffected by the chemical modification process.

42. A process as claimed in claim 24 where the polyimide membrane is the inner-layer of a dual-layer hollow fibre, the outer-layer of said dual-layer hollow fibre comprising a polymer which is substantially unaffected by the chemical modification process.

* * * * *